United States Patent [19]

Frahme

[11] 4,313,789

[45] Feb. 2, 1982

[54] LIGHTWEIGHT REFRACTORY FIBER BURNER BLOCK

[75] Inventor: Carl E. Frahme, Canyon Country, Calif.

[73] Assignee: Industrial Insulations Inc., City of Industry, Calif.

[21] Appl. No.: 104,354

[22] Filed: Dec. 17, 1979

[51] Int. Cl.³ .......................... B29C 13/00; F23C 5/00

[52] U.S. Cl. ...................................... 162/152; 52/218; 52/606; 110/336; 162/228; 264/87; 264/138; 428/36; 428/902; 431/159

[58] Field of Search ..................... 264/87, 65, 66, 138; 52/218, 606; 110/182.5, 336; 428/36, 902; 431/181, 187, 188, 347, 159; 162/152, 163, 227, 387, 395, 415, 228

[56] References Cited

U.S. PATENT DOCUMENTS

| | | | |
|---|---|---|---|
| 2,311,588 | 2/1943 | Denning | 264/87 |
| 3,275,497 | 9/1966 | Weiss et al. | 264/87 |
| 3,649,406 | 3/1972 | McNish | 264/87 |
| 3,719,553 | 3/1973 | Dorril et al. | 264/87 |
| 3,935,060 | 1/1976 | Bloome | 264/87 |
| 3,947,535 | 3/1976 | Bagg et al. | 264/87 |

FOREIGN PATENT DOCUMENTS

| | | | |
|---|---|---|---|
| 1500720 | 2/1978 | United Kingdom | 110/336 |

*Primary Examiner*—Willard E. Hoag
*Attorney, Agent, or Firm*—Sellers and Brace

[57] ABSTRACT

A light-weight thick-walled unitary burner block adapted to embrace a burner installed in the wall of a high temperature furnace. The block is formed of spun refractory fibers accreted by vacuum deposition from an aqueous slurry.

14 Claims, 4 Drawing Figures

FIG. 1.
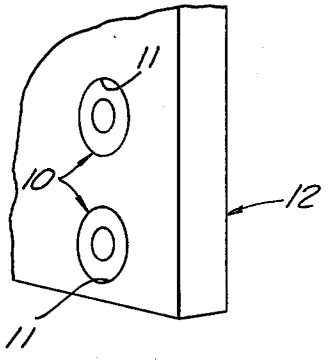
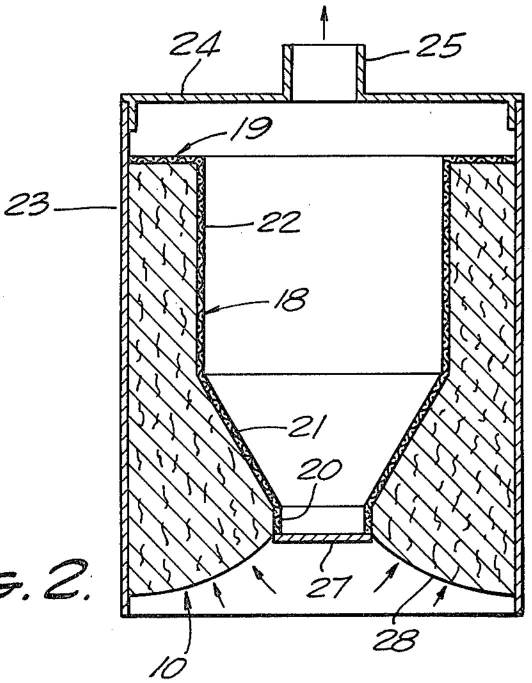
FIG. 2.
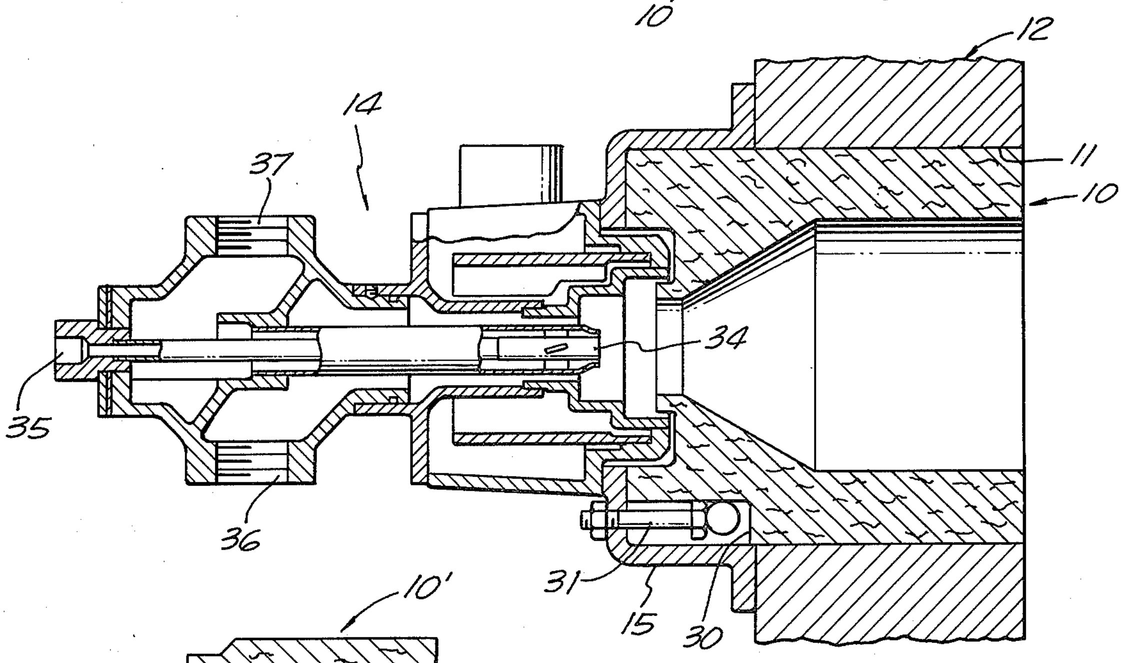
FIG. 3.
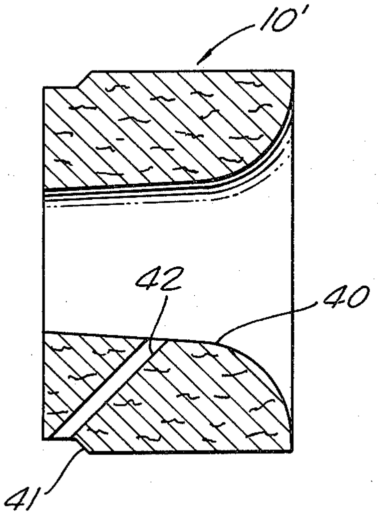
FIG. 4.

LIGHTWEIGHT REFRACTORY FIBER BURNER BLOCK

This invention relates to furnaces, and more particularly to an improved light-weight unitary burner block formed of vacuum deposited refractory fibers.

BACKGROUND OF THE INVENTION

High temperature furnaces are customarily heated by at least one and usually by a multiplicity of burners supported externally and removably on one or more walls of the furnace chamber and serve to heat this chamber to temperatures ranging between 1,600° and 3,000° F. The wall orifices into which the burner nozzles project are subjected to extremely hostile and harsh conditions. Heretofore it has been substantially the universal practice to utilise a cast burner block or collar replaceably mounted in the furnace wall and surrounding the burner nozzle. Such blocks, commonly known as "castables", are molded to shape and size from high temperature cement compositions. Such blocks are not only extremely heavy to install, service and replace but have very poor thermal shock absorbing capabilities. In consequence, they are subject to spalling, chipping and cracking, particularly during furnace start-up and shut-down operations. Larger embodiments of these conventional castable blocks weigh 800 to 1,100 lbs each and, in some furnace installations, such blocks may have to be installed 50 to 80 feet above ground level. This requires special equipment and poses hazards to the furnace, the equipment and particularly to the crews performing the service and installation operations.

SUMMARY OF THE INVENTION

This invention avoids the serious shortcomings and disadvantages referred to above and others of a related nature. Its objectives are accomplished by vacuum forming a block to the desired shape and size from an aqueous slurry of long refractory fibers and suitable binder materials. Spun fibers of the type produced by centrifugal spinning technique and known commercially as spun refractory fibers typically have a length averaging three to six inches or more, and the use of such fibers or fibers of similar length is essential in the vaccum accretion of blocks having deposition thicknesses in excess of about two inches. The technique for forming refractory modules having unusual thickness and a density of ten to twelve pounds per cubic foot was jointly discovered by Gary E. Wygant and Carl E. Frahme and disclosed in their co-pending patent application for United States Letters Patent Ser. No. 919,230 filed June 26, 1978 now U.S. Pat. No. 4,202,148 granted May 13, 1980. As disclosed in that application, it was found that modules or components having a wall thickness very substantially greater than had previously been made could be formed in a highly satisfactory uniform manner. It has now been found that equally satisfactory thick walled components can be formed which vary in thickness, shape and configuration from end-to-end thereof. Specially constructed molds are employed having a perforated internal core wall in a desired surface of revolution shape and an imperforate exterior wall open at one end and connected to a vacuum source. This mold is submerged in an aqueous slurry of the refractory fibers and retained there until the mold cavity is filled to the desired level. After removal from the mold, thus formed the homogeneous refractory fiber block is tailored to a desired finished size, if desired, or it can be installed in the furnace wall as initially molded. The outer periphery may be cylindrical or tailored to any desired shape and size for snug installation in a particular furnace wall opening.

Refractory burner blocks made in accordance with this invention typically have a weight of the order of one tenth of a comparable prior art castable block. They withstand temperatures of 1,600° to 3,000° F. are immune to spalling, chipping and cracking as well as to thermal shocks typically occuring during start-up and shut-down operations.

Accordingly, it is a primary object of this invention to provide a unique lightweight high-temperature refractory burner block and a method of making the same for installation embracing a burner in a high temperature furnace wall.

Another object of the invention is the provision of a thick walled refractory fiber burner block and a method of making the same to a configuration suitable for use with gun-type burners and with burners having a flat radial flame.

Another object of the invention is the provision of a novel method for molding a multi-layer thick-walled tubular burner block by vacuum deposition of ceramic fibers to fill the tube-like cavity of a mold having a foraminous internal surface of revolution and an imperforate outer wall.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary perspective view of a portion of a furnace wall having a pair of the invention burner blocks installed between the inner and outer surfaces thereof;

FIG. 2 is a cross sectional view through a suitable mold for making a burner block usable with a gun type burner, and showing a freshly molded burner block prior to removal therefrom;

FIG. 3 is a cross sectional view through a portion of a furnace wall showing the finished gun type burner block installed therein along with a typical gun type burner;

FIG. 4 is a cross sectional view of a finished burner block suitable for use with a burner having a flat radial flame.

Referring more particularly to FIGS. 1 to 3, there is shown one preferred embodiment of the invention burner block as made for use with a gun type burner. This block, designated generally 10, is shown in FIG. 1 as mounted in cylindrical openings 11 through the wall 12 of a high temperature furnace such as a furnace operating at a temperature ranging between 1,600° and 2,600° F. Block 10 typically has an axial length substantially greater than the thickness of the furnace wall, as indicated in FIG. 3. As shown in that figure, a suitable gun type burner, designated generally 14 and described in greater detail presently, is suitably secured to a base collar 15 secured to the furnace wall in a manner well known to those skilled in the furnace art.

The lightweight high temperature burner block 10 is suitably molded approximately to its finished shape in a mold such as that illustrated in FIG. 2. As there shown, a suitable mold includes an inner perforated tubular member 18 having a surface of revolution of differing diameters axially thereof and including a radially disposed end ring 19 secured to its larger end. Member 18 includes a short cylindrical section 20, a frusto conical section 21, and a generally cylindrical section 22. However, it will be understood that section 22 may be acutely tapered at an angle smaller than the taper of section 21 with its smaller end merging with the larger end of section 21.

Snugly embracing the periphery of perforated ring 19 is an imperforate outer mold member 23 capped at its upper end by a suitably secured end cap 24 provided with a collar 25 connectable to a source of high vacuum. The opposite or lower end of outer mold member 23 is open and preferably extends beyond the lower end of the perforated section 20 which is closed by an imperforate end cap 27.

In use, the assembled mold components are submerged in an aqueous slurry of refractory fibers 3 to 6 or more inches long and a suitable binder material. Inorganic refractory fibers suitable for the practise of this invention are disclosed in detail in the above identified co-pending application of Gary E. Wygant and Carl E. Frahme. Inorganic refractory fibers formed by the well known spinning technique and known commercially as spun refractory fibers have been found particularly satisfactory in forming burner blocks having a wall thickness of at least three inches and as thick as ten inches. Each of the specific examples of such fibers found to be satisfactory in making burner blocks as disclosed in the aforesaid co-pending application may be used and are to be understood as incorporated herein by reference. It has been discovered that high quality burner blocks having walls three inches and up to ten inches thick radially of the surface of revolution can be successfully made by vacuum deposition provided long fibers 3 and more inches in length are employed. The fibers are deposited progressively in layers which tend to lie parallel to the perforated core member. As the inner end adjacent the perforated ring 19 becomes filled it is found that the outer end opposite perforated section 21 continues to increase in thickness until the mold becomes filled along a curved configuration such as that represented at 28. The entire block is of highly uniform density ranging between 10 and 12 lbs per cubic foot.

After block 10 has been molded to the shape shown in FIG. 2, it is removed from the mold assembly. The interior surface of revolution requires no finishing operation; however, the curved end 28 does and is tailored to a suitable configuration such as that shown in FIG. 3, using suitable cutting and milling tools. Also the outer cylindrical surface may be trimmed to fit snugly over the opening 11 in the furnace wall. Fiber material may also be cut away to provide a well such as that indicated at 30 to seat the L-shaped anchor bolts 31 sometimes used to mount collar 15 to block 10. Two or more of these anchor bolts 31 are usually employed.

Burner 14 is of a well known type and includes a burner nozzle 34 supplied with fuel through duct 35. Pressurized air is supplied via inlet 36, and gaseous fuel or steam may be supplied via inlet 37.

Referring now to FIG. 4, there is shown a second refractory fiber burner block 10' suitable for use with a conventional burner known as a flat radial flame burner. Block 10' is formed using a mold constructed similarly to that described above in connection with FIG. 2 except that the inner core member comprises a screen or perforated core sheet in the shape of a surface of revolution and conforming with the finished surface 40. The major length of this surface is a slightly flaring tube which merges into a rapidly expanding arcuate surface. The exterior surface is generally cylindrical but, after molding, it is tailored as indicated at 41 and as necessary for assembly to the mounting collar of a flat flame type burner. The inclined passage 42 is also formed at this time to admit a pilot or ignitor device commonly used with flat flame burners.

While the particular lightweight refractory fiber burner block herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A lightweight dimensionally-stable, homogeneous burner block adapted for installation about a burner nozzle discharging through a furnace wall into a furnace typically operating at temperatures of 1600° F. and higher, said block being formed essentially of refractory fibers having a length of 3 to 6 inches or more accreted by vacuum deposition from an aqueous slurry of said fibers to a radial thickness of at least three inches about a perforated inner mold member having a surface of revolution, said perforated surface of said tubular burner block conforming to the shape of an imperforate outer cup-shaped mold member embracing said perforated mold member and having an inlet for said slurry of fibers only at the end thereof remote from said one end wall of said burner block and said inner and outer mold members being removable from said burner block after the cavity therebetween has been filled with said vacuum deposited fibers.

2. A burner block as defined in claim 1 characterized in that said surface of revolution is smaller in diameter at one axial end than at the other end thereof.

3. A burner block as defined in claim 2 characterized in that said block has a wall thickness radially of said surface of revolution of about 4 inches or more.

4. A burner block as defined in claim 2 characterized in that the diameter of the larger end of said surface of revolution is several times the diameter of said smaller end, and said surface of revolution being shaped for use with a burner designed to operate with a generally flat disc-like radial flame lying normal to the axis of said surface of revolution and adjacent the larger diameter thereof.

5. A burner block as defined in claim 1 characterized in that said block has a density of the order of 10–12 pounds per cubic foot.

6. A burner block as defined in claim 2 characterized in that said smaller diameter end of said surface of revolution is sized to seat and be coaxially aligned with the nozzle end of a burner with which said block is adapted to be used.

7. A burner block as defined in claim 6 characterized in that said surface of revolution diverges towards said larger end in frusto-conical steps of different pitch.

8. A lightweight homogeneous burner block of refractory fibers having a length of 3 to 6 inches or more suitable for use in an atmosphere exposed to a temperature of at least 1,600° F., said block comprising a unitary ring of said fibers accreted by vacuum deposition from an aqueous slurry thereof, said ring having a central passage which flares outwardly from a smaller end sized to embrace the nozzle end of a burner assembly to a larger end, and said unitary ring having a radial wall thickness of at least three inches.

9. A burner block as defined in claim 8 characterized in that said block has a density of about 10 to 12 pounds per cubic foot.

10. A burner block as defined in claim 8 characterized in that the cross sectional area of the larger end of said central passage is several times greater than the area of the smaller end thereof and suitable to embrace a generally flat disc-like burner flame.

11. A burner block as defined in claim 8 characterized in that said central passage diverges from the smaller end thereof and substantially througout its length to accommodate the long jet like flame or a jet type burner.

12. The method of forming a lightweight homogeneous burner block of refractory fibers suitable for use exposed to furnace chamber temperatures in the range of 1600° F. to 3000° F., comprising:

providing a mold having an annular cavity formed by an inner perforated annular member located coaxially of an imperforate cup-shaped housing having the bottom portion thereof connected to a source of vacuum and having its sidewall spaced 3 inches or more from a perforated tubular member, the inner end of said annular cavity being closed by an outwardly extending portion of said perforated member and the outer end of said perforated member being closed;

submerging said mold in an aqueous slurry of refractory fibers of a material capable of withstanding temperatues in the range of 1600° to 3000° F. and the majority of which have a length of 3 to 6 inches or more until said annular mold cavity has become filled with said fibers accreted by vacuum deposition onto said perforated tubular member; and removing said vacuum molded burner block from said mold and drying the same.

13. The method defined in claim 12 characterized in the step of utilizing a perforated tubular member having a relatively small diameter outer end sized to accommodate a burner nozzle and increasing in diameter to a maximum diameter at the opposite inner end of said perforated member.

14. The method defined in claim 13 characterized in the step of trimming and tailoring the outer end of said burner block after the same is dry to accommodate the components of a burner nozzle to be mounted in axial alignment with the axis of said burner block.

* * * * *